(12) United States Patent
Thota et al.

(10) Patent No.: US 11,675,632 B2
(45) Date of Patent: Jun. 13, 2023

(54) SYSTEM AND METHOD FOR IMPLEMENTING A SINGLE WINDOW INTEGRATED MODULE

(71) Applicant: JPMorgan Chase Bank, N.A., New York, NY (US)

(72) Inventors: Narayana Swamy Thota, Andhra Pradesh (IN); Sumitra Nandan Mishra, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 232 days.

(21) Appl. No.: 17/133,762

(22) Filed: Dec. 24, 2020

(65) Prior Publication Data

US 2022/0206880 A1 Jun. 30, 2022

(51) Int. Cl.
| | | |
|---|---|---|
| G06F 9/54 | (2006.01) | |
| G06F 21/31 | (2013.01) | |
| G06F 9/22 | (2006.01) | |
| G06F 9/48 | (2006.01) | |
| H04B 1/38 | (2015.01) | |

(52) U.S. Cl.
CPC ............... *G06F 9/541* (2013.01); *G06F 9/22* (2013.01); *G06F 9/48* (2013.01); *G06F 21/31* (2013.01); *H04B 1/38* (2013.01)

(58) Field of Classification Search
None
See application file for complete search history.

(56) References Cited

U.S. PATENT DOCUMENTS

2016/0124742 A1* 5/2016 Rangasamy ............. G06F 8/30
  717/103
2020/0358876 A1* 11/2020 Kulkarni ................. H04L 67/10

* cited by examiner

*Primary Examiner* — Syed A Roni
(74) *Attorney, Agent, or Firm* — Greenblum & Bernstein, P.L.C.

(57) ABSTRACT

Various methods, apparatuses/systems, and media for implementing a single window integrated platform are disclosed. A processor is operatively connected with one or more memories via a communication network. The processor receives a request from a user via a user computing device to develop a micro service; authenticates the user based on verifying login information of the user; receives information data related to the requested micro service; generates products application programming interface (API) to display selectable products based on the information data of the requested micro service. The processor also receives input on selected products; triggers a dynamic workflow based on the selected products; interacts with onboarding APIs to develop the micro service in response to the triggering of the dynamic workflow; and transmits a notification to the user computing device when an end state of the dynamic workflow is detected.

18 Claims, 7 Drawing Sheets

SYSTEM AND METHOD FOR IMPLEMENTING A SINGLE WINDOW INTEGRATED MODULE

TECHNICAL FIELD

This disclosure generally relates to micro service development, and, more particularly, to methods and apparatuses for implementing a single window integrated module that provides a platform for a one stop window to allow all on-boarding requests from the context of a micro service.

BACKGROUND

In today's typical micro service development lifecycle, a user (i.e., a developer) manually requests access to each API tool available within a firm, to perform a specific function which requires specific knowledge to leverage these tools. Manual dispersed steps needed to create or onboard to basic services which may take about two to three weeks of time even before a user starts writing a first line of code. For example, today, if a developer needs to create a micro service which uses event streaming (deployed on private cloud and uses a database), the developer may need to manually browse through multiple portals/platforms namely, request center, access requesting system, identity management platform, database, event streaming service, etc. to create multiple requests and track them manually. This process is generally serial in nature and a developer spends approximately two to three weeks of lead time to get these requests completed before starting first line of code.

Additionally, the same toil may be experienced for multiple regions as any micro service that one creates may need development, validation, and production set-ups as a minimum. Also, there are dependencies on the people who can trigger that event.

These manual conventional processes in the micro service development may prove to be time consuming and inefficient.

SUMMARY

The present disclosure, through one or more of its various aspects, embodiments, and/or specific features or sub-components, provides, among other features, various systems, servers, devices, methods, media, programs, and platforms for implementing a single window integrated module that provides a one stop window to allow all on-boarding requests from the context of a micro service, but the disclosure is not limited thereto. For example, the present disclosure, through one or more of its various aspects, embodiments, and/or specific features or sub-components, also provides, among other features, various systems, servers, devices, methods, media, programs, and platforms for implementing a single window integrated module that provides an automated workflow which takes all inputs at one shot, and then executes taking care of all hand-offs and provides the ultimate outcome as a notification, but the disclosure is not limited thereto. According to exemplary embodiments, the single window integrated module provides solutions that include the flows like FID (functional ID) creation and onboarding to identity management platform, messaging platform, database, database management system, private cloud and Kubernetes platform onboarding, but the disclosure is not limited thereto. For example, according to exemplary embodiments, the single window integrated module can be expand to monitoring platform, load balancer provider, OIDC (open ID connect) provider and log search and analytics onboarding as well.

According to an aspect of the present disclosure, a method for implementing a single window integrated platform by utilizing one or more processors and one or more memories is disclosed. The method may include: receiving a request from a user via a user computing device to develop a micro service; authenticating the user based on verifying login information of the user; receiving information data related to the requested micro service; generating products application programming interface (API) to display selectable products based on the information data of the requested micro service; receiving input on selected products; triggering a dynamic workflow based on the selected products; interacting with onboarding APIs to develop the micro service in response to the triggering of the dynamic workflow; and transmitting a notification to the user computing device when an end state of the dynamic workflow is detected.

According to a further aspect of the present disclosure, the method may further include: tracking all dependencies associated with the requested micro service centrally on the single window integrated platform.

According to yet another aspect of the present disclosure, wherein the single window integrated platform is configured to receive user input to replicate the same actions in a single click for multiple environments.

According to a further aspect of the present disclosure, the method may further include: retrieving application metadata associated with the requested micro service by utilizing an infrastructure and application reference data API.

According to another aspect of the present disclosure, the method may further include: receiving a request for a provision identity associated with the micro service; generating a provision API that calls to return the provision identity; and triggering the dynamic workflow based on the provision identity.

According to an additional aspect of the present disclosure, wherein the provision API may be utilized for one or more of the following: submitting a request, viewing request status, viewing all requests, updating a request, cancelling a request, and cloning a request.

According to yet another aspect of the present disclosure, wherein the products API may be utilized for one or more of the following: adding products, updating products, deleting products, getting products, getting trending products, and sorting requested products.

According to a further aspect of the present disclosure, a system for implementing a single window integrated platform is disclosed. The system may include a processor and one or more memories operatively connected with the processor via a communication network. The processor may be configured to: receive a request from a user via a user computing device to develop a micro service; authenticate the user based on verifying login information of the user; receive information data related to the requested micro service; generate products application programming interface (API) to display selectable products based on the information data of the requested micro service; receive input on selected products; trigger a dynamic workflow based on the selected products; interact with onboarding APIs to develop the micro service in response to the triggering of the dynamic workflow; and transmit a notification to the user computing device when an end state of the dynamic workflow is detected.

According to another aspect of the present disclosure, the processor may be further configured to: track all dependencies associated with the requested micro service centrally on the single window integrated platform.

According to an aspect of the present disclosure, wherein the processor may be further configured to: retrieve application metadata associated with the requested micro service by utilizing an infrastructure and application reference data API.

According to a further aspect of the present disclosure, wherein the processor may be further configured to: receive a request for a provision identity associated with the micro service; generate a provision API that calls to return the provision identity; and trigger the dynamic workflow based on the provision identity.

According to an additional aspect of the present disclosure, a non-transitory computer readable medium configured to store instructions for implementing a single window integrated platform is disclosed. The instructions, when executed, may cause a processor to perform the following: receive a request from a user via a user computing device to develop a micro service; authenticate the user based on verifying login information of the user; receive information data related to the requested micro service; generate products application programming interface (API) to display selectable products based on the information data of the requested micro service; receive input on selected products; trigger a dynamic workflow based on the selected products; interact with onboarding APIs to develop the micro service in response to the triggering of the dynamic workflow; and transmit a notification to the user computing device when an end state of the dynamic workflow is detected.

According to another aspect of the present disclosure, the instructions, when executed, may cause the processor to further perform the following: track all dependencies associated with the requested micro service centrally on the single window integrated platform.

According to an aspect of the present disclosure, the instructions, when executed, may cause the processor to further perform the following: retrieve application meta data associated with the requested micro service by utilizing an infrastructure and application reference data API.

According to a further aspect of the present disclosure, the instructions, when executed, may cause the processor to further perform the following: receive a request for a provision identity associated with the micro service; generate a provision API that calls to return the provision identity; and trigger the dynamic workflow based on the provision identity.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
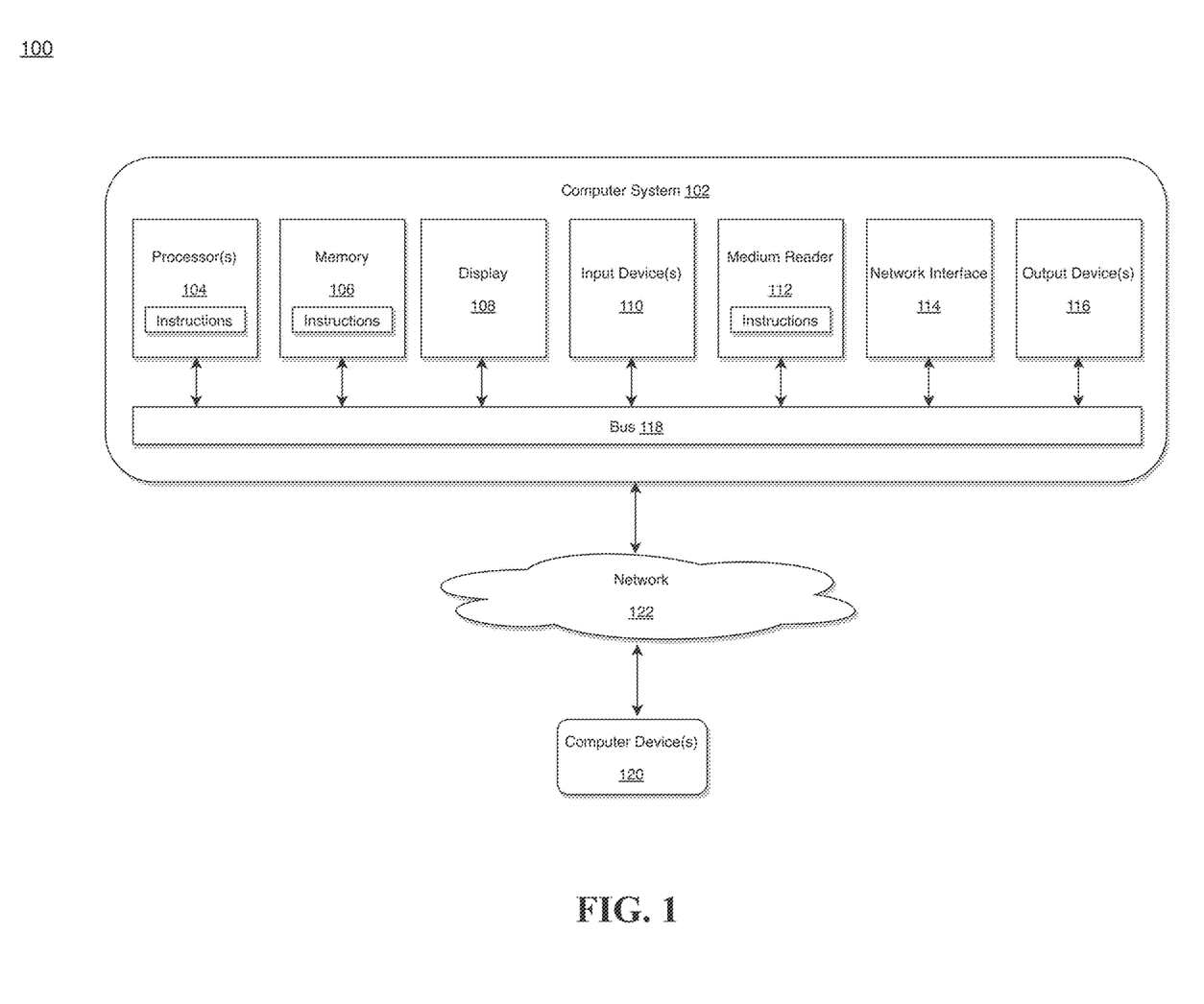
FIG. 1 illustrates a computer system for implementing a single window integrated module in accordance with an exemplary embodiment.

FIG. 1 is an exemplary system for implementing a single window integrated platform in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1 the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last, for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a single window integrated module that provides a one stop window to allow all on-boarding requests from the context of a micro service, but the disclosure is not limited thereto.

Figure 2:
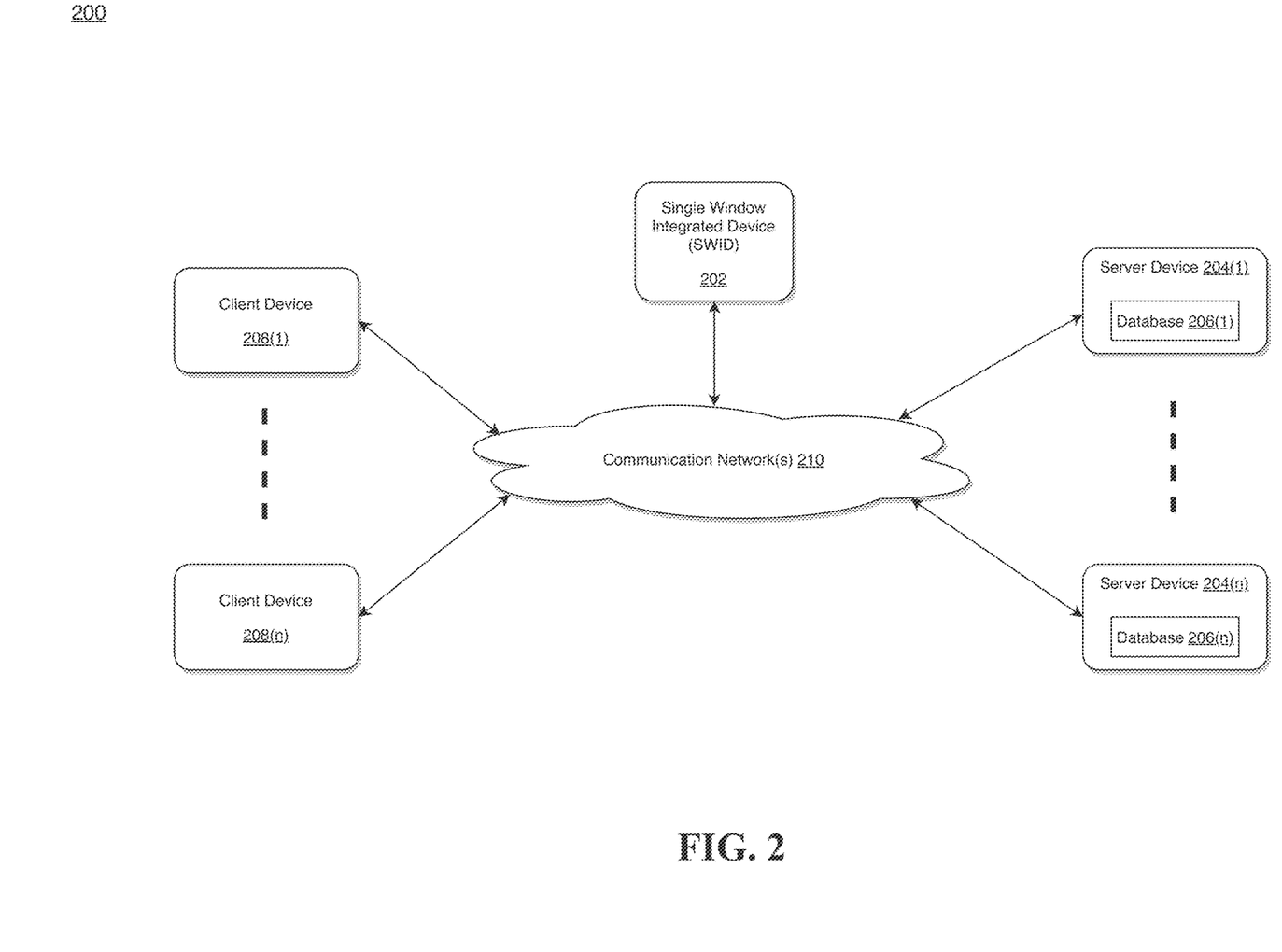
FIG. 2 illustrates an exemplary diagram of a network environment with a single window integrated device in accordance with an exemplary embodiment.

Referring to FIG. 2, a schematic of an exemplary network environment 200 for implementing a single window integrated device (SWID) of the instant disclosure is illustrated.

According to exemplary embodiments, the above-described problems associated with conventional testing system may be overcome by implementing a SWID 202 having a single window integrated module as illustrated in FIG. 2 by providing a one stop window to allow all on-boarding requests from the context of a micro service, but the disclosure is not limited thereto.

The SWID 202 may be the same or similar to the computer system 102 as described with respect to FIG. 1.

The SWID 202 may store one or more applications that can include executable instructions that, when executed by the SWID 202, cause the SWID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SWID 202 itself, may be located in virtual server(s) running in a cloud-based computing environment rather than being tied to one or more specific physical network computing devices. Also, the application(s) may be running in one or more virtual machines (VMs) executing on the SWID 202. Additionally, in one or more embodiments of this technology, virtual machine(s) running on the SWID 202 may be managed or supervised by a hypervisor.

In the network environment 200 of FIG. 2, the SWID 202 is coupled to a plurality of server devices 204(1)-204(n) that hosts a plurality of databases 206(1)-206(n), and also to a plurality of client devices 208(1)-208(n) via communication network(s) 210. A communication interface of the SWID 202, such as the network interface 114 of the computer system 102 of FIG. 1, operatively couples and communicates between the SWID 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SWID 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SWID 202 may be a standalone device or integrated with one or more other devices or apparatuses, such as one or more of the server devices 204(1)-204(n), for example. In one particular example, the SWID 202 may be hosted by one of the server devices 204(1)-204(n), and other arrangements are also possible. Moreover, one or more of the devices of the SWID 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or tapes of network devices may be used. The server devices 204(1)-204(n) in this example may process requests received from the SWID 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SWID 202 that may be configured for implementing a single window integrated module that provides a one stop window to allow all on-boarding requests from the context of a micro service, but the disclosure is not limited thereto. For example, according to exemplary embodiments, the client devices 208(1)-208(n) in this example may include any type of computing device that can facilitate the implementation of the SWID 202 that may be configured for implementing a single window integrated module that provides an automated workflow which takes all inputs at one shot, and then executes taking care of all hand-offs and provides the ultimate outcome as a notification, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the SWID 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SWID 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SWID 202, the server devices 204(1)-204(n), or the client devices 208(1)-208(n), for example, may be configured to operate as virtual instances on the same physical machine. For example, one or more of the SWID 202, the server devices 204(1)-204(n), or the client devices 208(1)-208(n) may operate on the same physical device rather than as separate devices communicating through communication network(s) 210. Additionally, there may be more or fewer SWIDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic any suitable form (e.g., voice and modem), wireless traffic networks, cellular traffic networks, Packet Data Networks (PDNs), the Internet, intranets, and combinations thereof.

Figure 3:
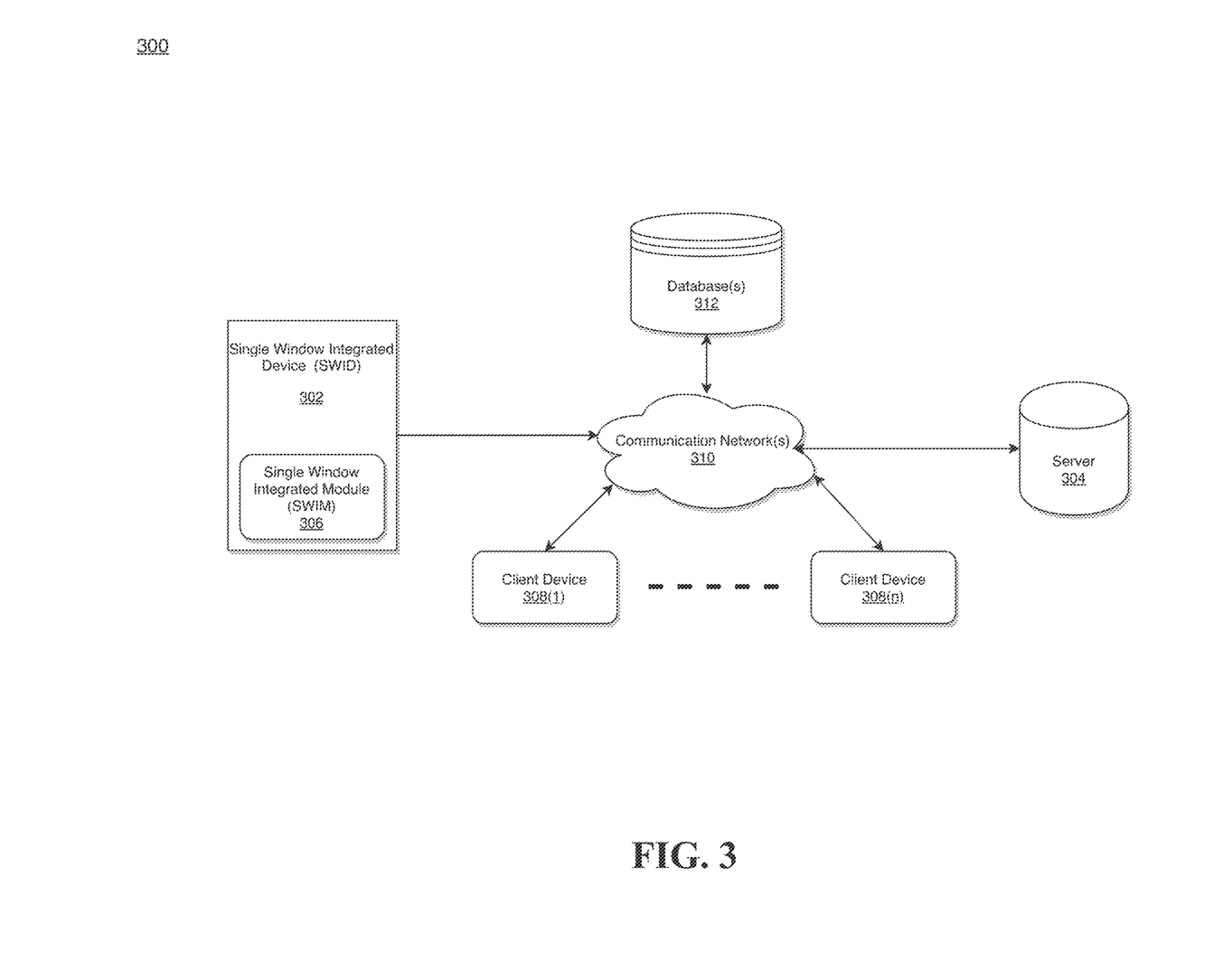
FIG. 3 illustrates a system diagram for implementing a single window integrated device with a single window integrated module in accordance with an exemplary embodiment.
Figure 5:
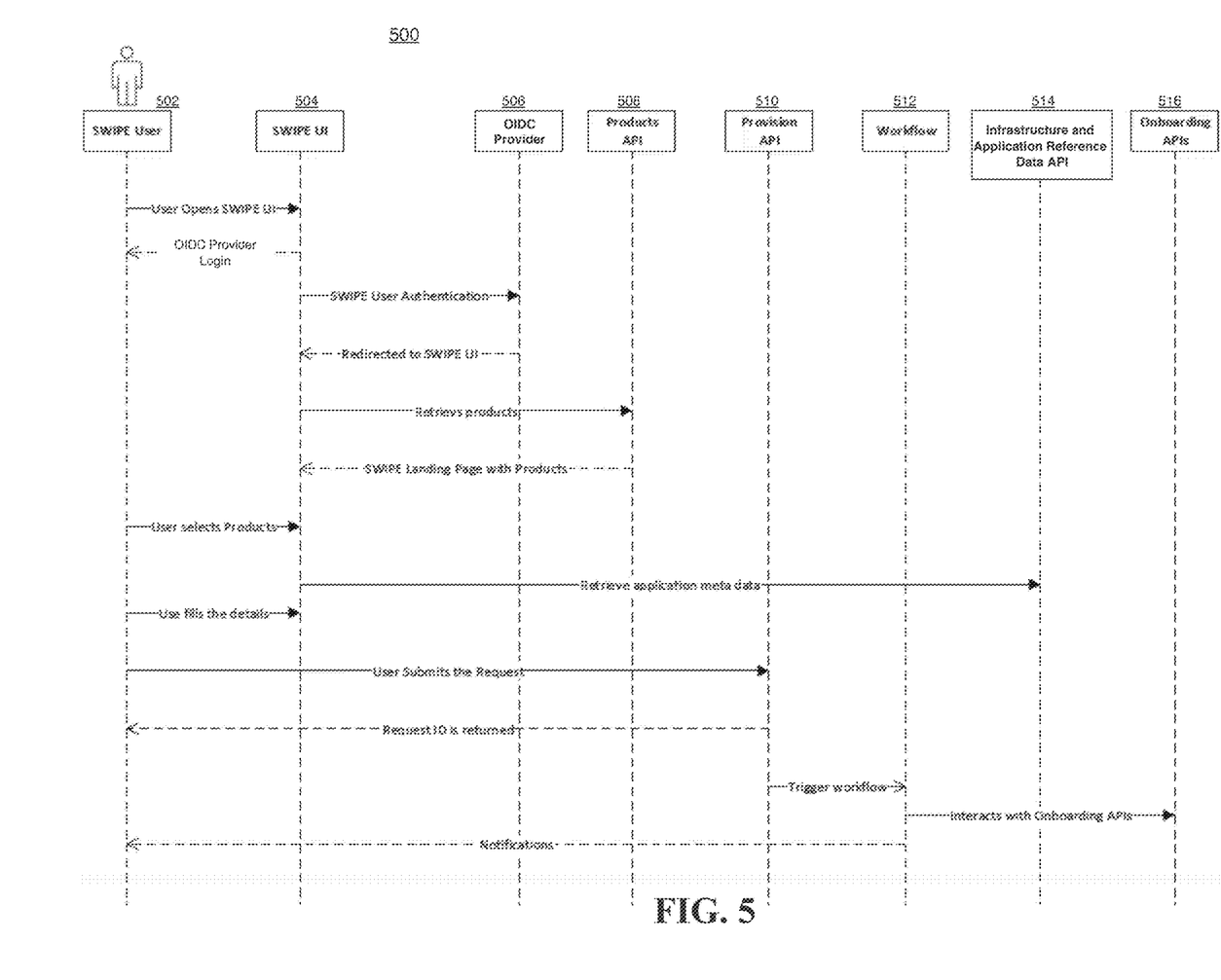
FIG. 5 illustrates a provision request sequence in accordance with air exemplary embodiment.
Figure 6:
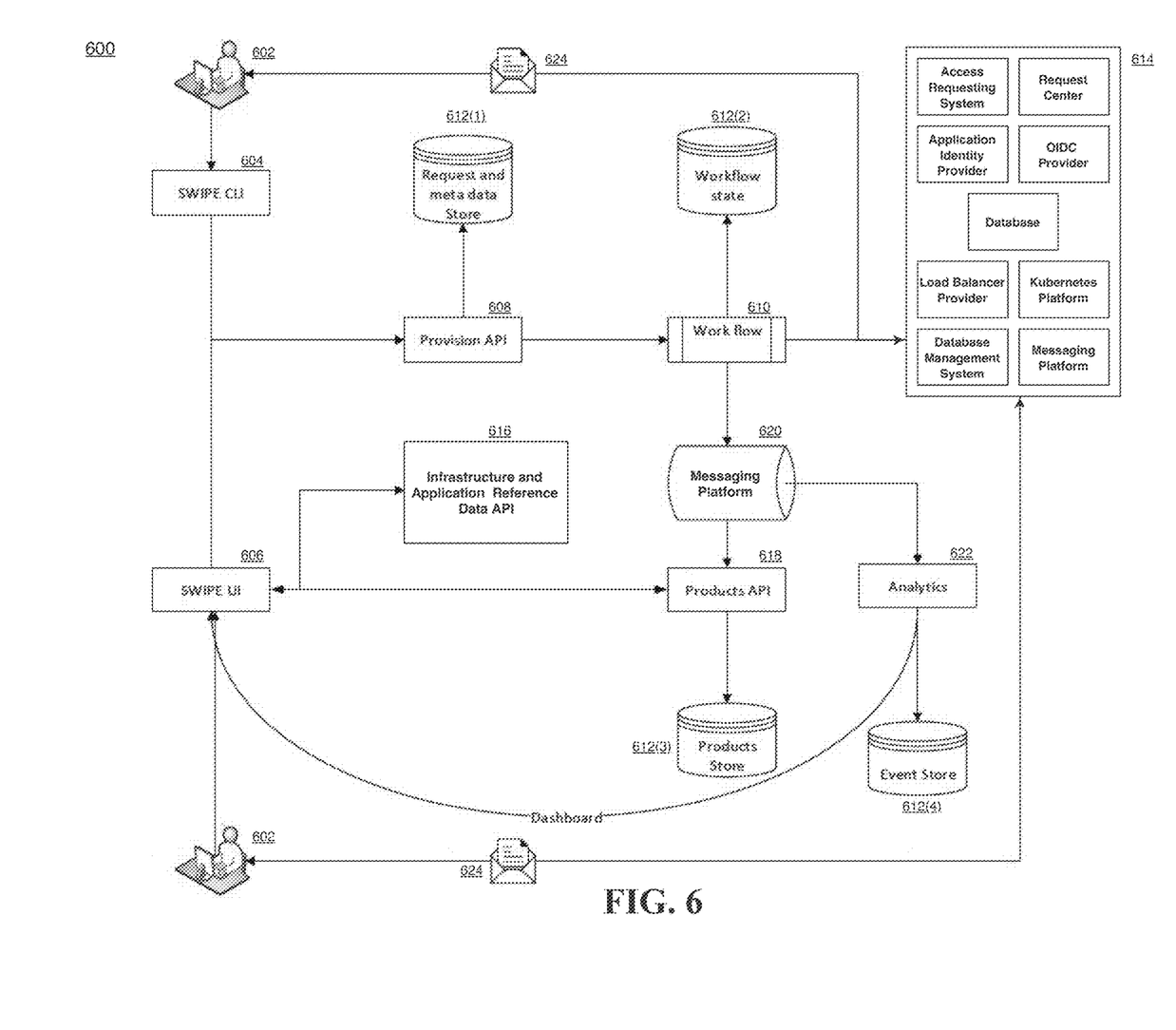
FIG. 6 illustrates another exemplary system diagram for implementing single window integrated module in accordance with an exemplary embodiment.

FIG. 3 illustrates a system diagram for implementing a SWID with a single window integrated module (SWIM) in accordance with an exemplary embodiment. According to exemplary embodiments, the SWIM may also be referred to as a single window integrated platform for engineers (SWIPE) as illustrated in FIGS. 5 and 6 below.

As illustrated in FIG. 3, the SWID 302 including the SWIM 306 may be connected to a server 304, and a database(s) 312 via a communication network 310. The SWID 302 may also be connected to a plurality of client devices 308(1)-308(n) via the communication network 310, but the disclosure is not limited thereto. According to exemplary embodiments, the SWIM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the SWID 302 is described and shown in FIG. 3 as including the SWIM 306, although it may include other rules, policies, modules, databases, or applications, for example. According to exemplary embodiments, the database(s) 312 may be embedded within the SWID 302. Although only one database(s) 312 is illustrated in FIG. 3, according to exemplary embodiments, a plurality of database(s) 312 may be provided. The database(s) 312 may include one or more memories configured to store information including: rules, programs, production requirements, configurable threshold values defined by a product team to validate against service level objective (SLO), machine learning cadence model, machine learning behavior model, log data, hash values, etc., but the disclosure is not limited thereto. According to exemplary embodiments, the SWIM 306 may be configured to be storage platform agnostic—configured to be deployed across multiple storage layers.

According to exemplary embodiments, the SWIM 306 may be configured to receive continuous feed of data from the database(s) 312 via the communication network 310.

As will be described below, the SWIM 306 may be configured to receive a request from a user via a user computing device to develop a micro service; authenticate the user based on verifying login information of the user; receive information data related to the requested micro service; generate products application programming interface (API) to display selectable products based on the information data of the requested micro service; receive input on selected products; trigger a dynamic workflow based on the selected products; interact with onboarding APIs to develop the micro service in response to the triggering of the dynamic workflow; and transmit a notification to the user computing device when an end state of the dynamic workflow is detected, but the disclosure is not limited thereto.

The plurality of client devices 308(1)-308(n) are illustrated as being in communication with the SWID 302. In this regard, the plurality of client devices 308(1)-308(n) may be "clients" of the SWID 302 and are described herein as such. Nevertheless, it is to be known and understood that the plurality of client devices 308(1)-308(n) need not necessarily be "clients" of the SWID 302, or any entity described in association therewith herein. Any additional or alternative relationship may exist between either or more of the plurality of client devices 308(1)-308(n) and the SWID 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SWID 302 via broadband or cellular communication. Of course, these embodiments are merely exemplary and are not limiting or exhaustive.

Figure 4:
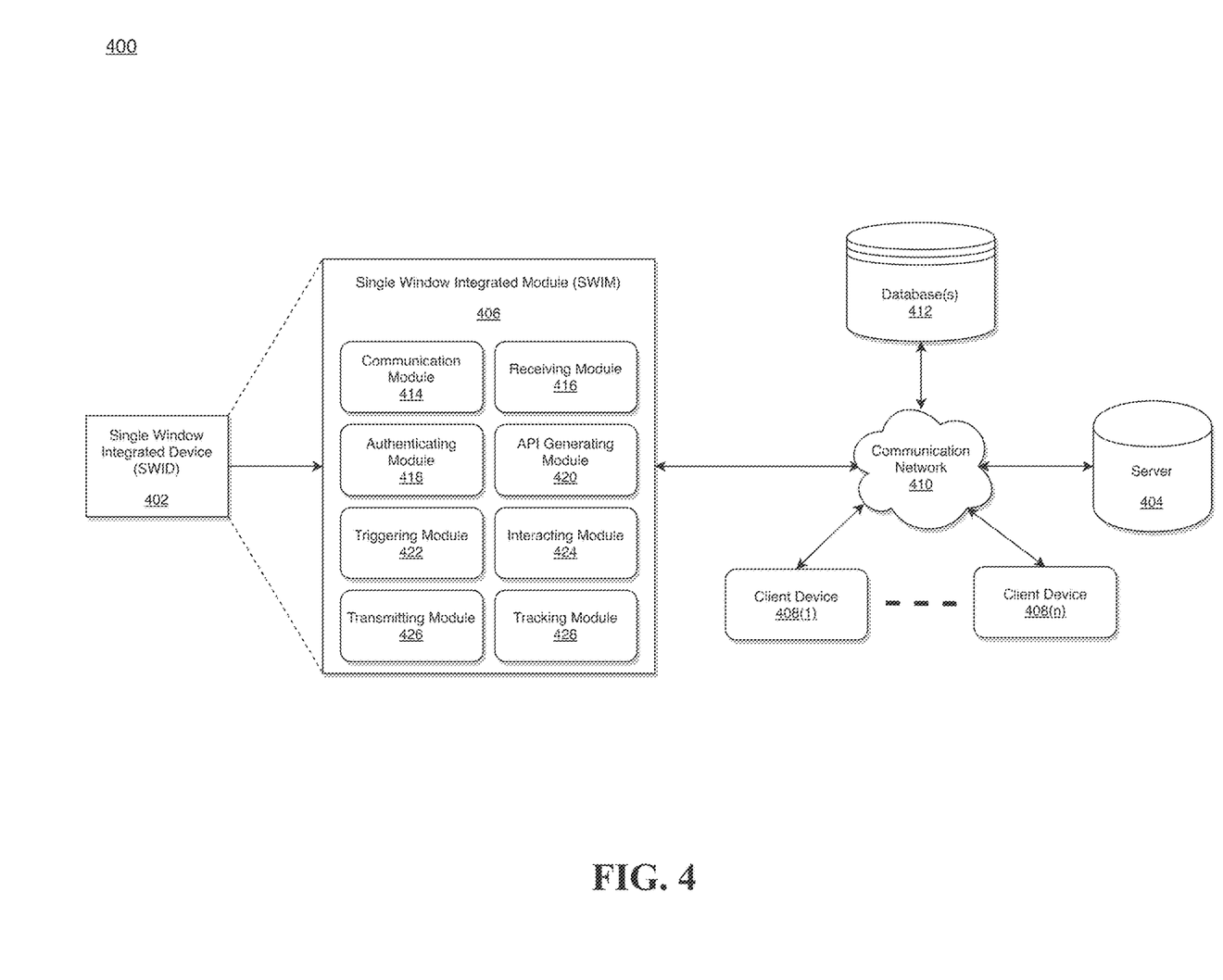
FIG. 4 illustrates a system diagram for implementing single window integrated module of FIG. 3 in accordance with an exemplary embodiment.

FIG. 4 illustrates a system diagram for implementing a SWIM of FIG. 3 in accordance with an exemplary embodiment. As illustrated in FIG. 4, the system 400 may include a SWID 402 within which a SWIM 406 may be embedded, a database(s) 412, a server 404, client devices 408(1)-408(n), and a communication network 410. According to exemplary embodiments, the SWID 402, SWIM 406, database(s) 412, the server 404, the client devices 408(1)-408(n), and the communication network 410 as illustrated in FIG. 4 may be the same or similar to the SWID 302, the SWIM 306, the database(s) 312, the server 304, the client devices 308(1)-308(n), and the communication network 310, respectively, as illustrated in FIG. 3.

As illustrated in FIG. 4, the SWIM 406 may include communication module 414, a receiving module 416, an authenticating module 418, an API generating module 420, a triggering module 422, an interacting module 424, a transmitting module 426, and a tracking module 428. According to exemplary embodiments, the database(s) 412 may be external to the SWID 402 may include various systems that are managed and operated by an organization. Alternatively, according to exemplary embodiments, the database(s) 412 may be embedded within the SWID 402 and/or the SWIM 406. According to exemplary embodiments, the database(s) 412 may include a request and meta data database, workflow state database, products database, event database, etc. (see, e.g., FIG. 6).

The process may be executed via the communication network 410, which may comprise plural networks as described above. For example, in an exemplary embodiment, the various components of the SWIM 406 may communicate with the server 404, and the database(s) 412 via the communication network 410 and the communication module 414. Of course, these embodiments are merely exemplary and are not limiting or exhaustive.

According to exemplary embodiments, the communication network 410 and the communication module 414 may be configured to establish a link between the database(s) 412, the client devices 408(1)-408(n) and the SWIM 406.

According to exemplary embodiments, each of the communication module 414, receiving module 416, authenticating module 418, API generating module 420, triggering module 422, interacting module 424, transmitting module 426, and the tracking module 428 may be implemented by microprocessors or similar, they may be programmed using software (e.g., microcode) to perform various functions discussed herein and may optionally be driven by firmware and/or software. Alternatively, each of the each of the communication module 414, receiving module 416, authenticating module 418, API generating module 420, triggering module 422, interacting module 424, transmitting module 426, and the tracking module 428 may be implemented by dedicated hardware, or as a combination of dedicated hardware to perform some functions and a processor (e.g., one or more programmed microprocessors and associated circuitry) to perform other functions. Also, according to exemplary embodiments, each of the each of the communication module 414, receiving module 416, authenticating module 418, API generating module 420, triggering module 422, interacting module 424, transmitting module 426, and the tracking module 428 may be physically separated into two or more interacting and discrete blocks, units, devices, and/or modules without departing from the scope of the inventive concepts.

According to exemplary embodiments, each of the communication module 414, receiving module 416, authenticating module 418, API generating module 420, triggering module 422, interacting module 424, transmitting module 426, and the tracking module 428 of the SWIM 406 may be invoked by corresponding API, but the disclosure is not limited thereto.

FIG. 5 illustrates a provision request sequence in accordance with an exemplary embodiment. As illustrated in FIG. 5, the provision request sequence 500 may include a SWIPE (single window integrated platform for engineers) user 502, a SWIPE 504, OIDC provider 506, products API 508, provision API 510, workflow 512, infrastructure and application reference data API 514 and onboarding APIs 516.

FIG. 6 illustrates another exemplary system diagram for implementing single window integrated module in accordance with an exemplary embodiment. As illustrated in FIG. 6, the system 600 may include a SWIPE user 602 who may have an option to use either a SWIPE CLI 604 or a SWIPE UI 606, but the scope of the embodiments remain the same. As illustrated in FIG. 6, both the SWIPE CLI 604 and the SWIPE UI 606 may be operatively connected to provision API 608 which may be operatively connected to a work flow 610 and a request and meta data database 612(1). The work flow 610 may be operatively connected to a workflow state database 612(2) and one or more micro-services 614. According to exemplary embodiments, the micro-services 614 may include access requesting system, application identity provider, load balancer provider, database management system, request center, OIDC provider, database, Kubernetes platform, and messaging platform, but the disclosure is not limited thereto. The work flow 610 may be operatively connected to provisioning platform 620. The user 602 may be notified via email 624 when an end state of the dynamic workflow 610 is detected. According to exemplary embodiments, instead of email communication, other known electronic communication methods may be implemented by the SWIM 406.

According to exemplary embodiments, when the user 602 utilizes the SWIPE UI 606, SWIM 406 may implement additional methodologies as described above with reference to FIGS. 4 and 5. For example, the SWIPE UI 606 may be operatively connected to the provision API 608 which may be operatively connected to the work flow 610 and the request and meta data database 612(1) as disclosed above. In addition, the SWIPE UI 606 may also be operatively connected to infrastructure and application reference data APIs 616 and products API 618. The products API 618 may be operatively connected to the provisioning events messaging platform 620 which may be operatively connected to analytics 622. The products API 618 may also be operatively connected to products database 612(3) and the analytics 622 may be operatively connected to an event database 612(4).

According to exemplary embodiments, the implementation of the SWIPE that provides a one stop window to allow all on-boarding requests from the context of a micro service will be now described with reference to FIGS. 4-6.

According to exemplary embodiments, the receiving module 416 may be configured to receive a request from a user 502, 602 via a user computing device (i.e., one of 408(1)-408(n)) to develop a micro service. The authenticating module 418 may be configured to authenticate the user 502, 602 based on verifying login information of the user 502, 602. According to exemplary embodiments, the receiving module 416 may further be configured to receive information data related to the requested micro service 614.

According to exemplary embodiments, the API generating module 420 may be configured to generate products API 508, 618 to display selectable products based on the information data of the requested micro service 614.

According to exemplary embodiments, the receiving module 416 may be configured to receive input on selected products. The products may be accessed from the products database 612(3).

According to exemplary embodiments, the triggering module 422 may be configured to trigger a dynamic workflow 512, 610 based on the selected products. The interacting module 424 may be configured to interact with onboarding APIs 516 to develop the micro service in response to the triggering of the dynamic workflow 512, 610.

According to exemplary embodiments, the transmitting module 426 may be configured to transmit a notification (e.g., via email 624) to the user computing device (one of 408(1)-408(n)) when an end state of the dynamic workflow 512, 610 is detected.

According to exemplary embodiments, the tracking module 428 may be configured to track all dependencies associated with the requested micro service 614 centrally on the single window integrated platform.

According to exemplary embodiments, the SWIM 406 may implement a single window integrated platform that is configured to receive user input to replicate the same actions in a single click for multiple environments.

According to exemplary embodiments, the SWIM 406 may be configured to retrieve application meta data associated with the requested micro service 614 by utilizing a infrastructure and application reference data APIs 616.

According to exemplary embodiments, the receiving module 416 may be configured to receive a request for a provision identity associated with the micro service 614; generating a provision API 510, 608 that calls to return the provision identity. The triggering module 422 may be configured to trigger the dynamic workflow 512, 610 based on the provision identity.

According to exemplary embodiments, the provision API 510, 608 may be utilized for one or more of the following: submitting a request, viewing request status, viewing all requests, updating a request, cancelling a request, and cloning a request, but the disclosure is not limited thereto.

According to exemplary embodiments, the products API 508, 618 may be utilized for one or more of the following: adding products, updating products, deleting products, getting products, getting trending products, and sorting requested products, but the disclosure is not limited thereto.

Figure 7:
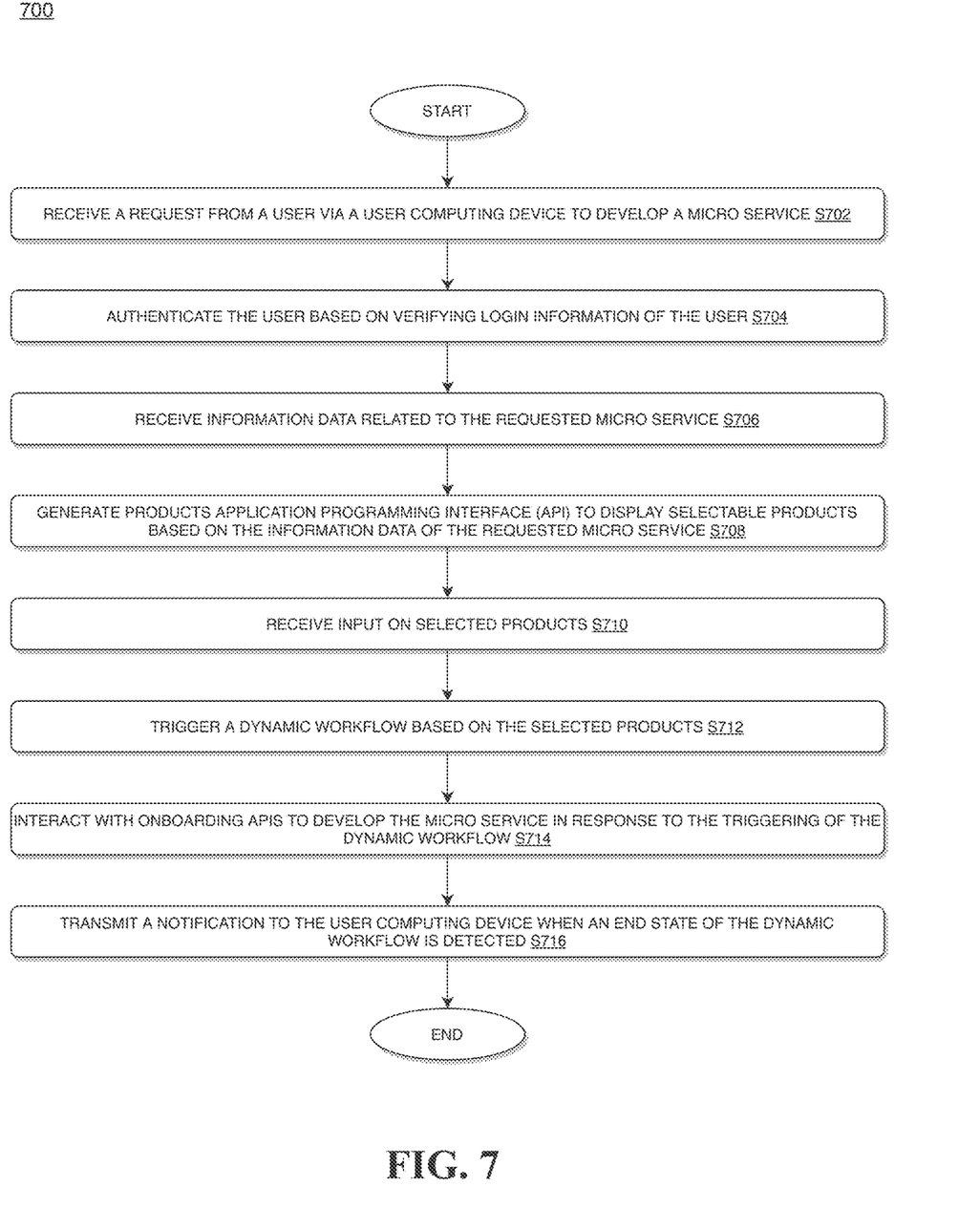
FIG. 7 illustrates a flow diagram for implementing single window integrated module in accordance with an exemplary embodiment.

FIG. 7 illustrates a flow diagram for implementing single window integrated module in accordance with an exemplary embodiment.

In the process 700 of FIG. 7, at step S702, a request may be received from a user via a user computing device to develop a micro service. At step S704, the user may be authenticated based on verifying login information of the user.

At step S706, information data may be received related to the requested micro service.

At step S708, products application programming interface (API) may be generated to display selectable products based on the information data of the requested micro service.

At step S710, input on selected products may be received.

At step S712, a dynamic workflow may be triggered based on the selected products.

At step S714, interaction with onboarding APIs may be implemented to develop the micro service in response to the triggering of the dynamic workflow.

At step S716, a notification may be transmitted to the user computing device when an end state of the dynamic workflow is detected.

According to exemplary embodiments, the process 700 may further include: tracking all dependencies associated with the requested micro service centrally on the single window integrated platform.

According to exemplary embodiments, the process 700 may further include: retrieving application meta data associated with the requested micro service by utilizing an infrastructure and application reference data API.

According to exemplary embodiments, the process 700 may further include: receiving a request for a provision identity associated with the micro service; generating a provision API that calls to return the provision identity; and triggering the dynamic workflow based on the provision identity.

According to exemplary embodiments, the process 700 may further include: utilizing the provision API for implementing one or more of the following: submitting a request, viewing request status, viewing all requests, updating a request, cancelling a request, and cloning a request, the disclosure is not limited thereto.

According to exemplary embodiments, the process 700 may further include: utilizing the products API for implementing one or more of the following: adding products, updating products, deleting products, getting products, getting trending products, and sorting requested products, but the disclosure is not limited thereto.

According to exemplary embodiments, a non-transitory computer readable medium may be configured to store instructions for implementing a single window integrated platform. According to exemplary embodiments, the instructions, when executed, may cause a processor embedded within the SWIM 406 or the SWID 402 to perform the following: receive a request from a user via a user computing device to develop a micro service; authenticate the user based on verifying login information of the user; receive information data related to the requested micro service; generate products application programming interface (API) to display selectable products based on the information data of the requested micro service; receive input on selected products; trigger a dynamic workflow based on the selected products; interact with onboarding APIs to develop the micro service in response to the triggering of the dynamic workflow; and transmit a notification to the user computing device when an end state of the dynamic workflow is detected. The processor may be the same or similar to the processor 104 as illustrated in FIG. 1 or the processor embedded within SWID 202, SWID 302, SWIM 306, SWID 402, and SWIM 406.

According to exemplary embodiments, the instructions, when executed, may further cause the processor 104 to perform the following: track all dependencies associated with the requested micro service centrally on the single window integrated platform.

According to exemplary embodiments, the instructions, when executed, may further cause the processor 104 to perform the following: retrieve application meta data associated with the requested micro service by utilizing an infrastructure and application reference data API.

According to exemplary embodiments, the instructions, when executed, may further cause the processor 104 to perform the following: receive a request for a provision identity associated with the micro service; generate a provision API that calls to return the provision identity; and trigger the dynamic workflow based on the provision identity.

According to exemplary embodiments as disclosed above in FIGS. 1-7, technical improvements effected by the instant disclosure may include platforms for implementing a single window integrated module that provides a one stop window to allow all on-boarding requests from the context of a micro service, but the disclosure is not limited thereto. According to exemplary embodiments as disclosed above in FIGS. 1-7, technical improvements effected by the instant disclosure may further include platforms for implementing a single window integrated module that provides an automated workflow which takes all inputs at one shot, and then executes taking care of all hand-offs and provides the ultimate outcome as a notification, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a single window integrated platform by utilizing one or more processors and one or more memories, the method comprising:

receiving a request from a user via a user computing device to develop a micro service;
authenticating the user based on verifying login information of the user;
receiving information data related to the requested micro service;
generating products application programming interface (API) to display selectable products based on the information data of the requested micro service;
receiving input on selected products;
triggering a dynamic workflow based on the selected products;
interacting with onboarding APIs to develop the micro service in response to the triggering of the dynamic workflow; and
transmitting a notification to the user computing device when an end state of the dynamic workflow is detected,
wherein the products API is utilized for one or more of the following: adding products, updating products, deleting products, getting products, getting trending products, and sorting requested products.

2. The method according to claim 1, further comprising:
tracking all dependencies associated with the requested micro service centrally on the single window integrated platform.

3. The method according to claim 1, wherein the single window integrated platform is configured to receive user input to replicate same actions in a single click for multiple environments.

4. The method according to claim 1, further comprising:
retrieving application meta data associated with the requested micro service by utilizing an infrastructure and application reference data API.

5. The method according to claim 1, further comprising:
receiving a request for a provision identity associated with the micro service;
generating a provision API that calls to return the provision identity; and
triggering the dynamic workflow based on the provision identity.

6. The method according to claim 5, wherein the provision API is utilized for one or more of the following: submitting a request, viewing request status, viewing all requests, updating a request, cancelling a request, and cloning a request.

7. A system for implementing a single window integrated platform, the system comprising:
a processor and one or more memories operatively connected with the processor via a communication network, wherein the processor is configured to:
receive a request from a user via a user computing device to develop a micro service;
authenticate the user based on verifying login information of the user;
receive information data related to the requested micro service;
generate products application programming interface (API) to display selectable products based on the information data of the requested micro service;
receive input on selected products;
trigger a dynamic workflow based on the selected products;
interact with onboarding APIs to develop the micro service in response to the triggering of the dynamic workflow; and transmit a notification to the user computing device when an end state of the dynamic workflow is detected, wherein the products API is utilized for one or more of the following: adding products, updating products, deleting products, getting products, getting trending products, and sorting requested products.

8. The system according to claim 7, wherein the processor is further configured to:

track all dependencies associated with the requested micro service centrally on the single window integrated platform.

9. The system according to claim 7, wherein the single window integrated platform is configured to receive user input to replicate same actions in a single click for multiple environments.

10. The system according to claim 7, wherein the processor is further configured to:

retrieve application meta data associated with the requested micro service by utilizing an infrastructure and application reference data API.

11. The system according to claim 7, wherein the processor is further configured to:

receive a request for a provision identity associated with the micro service;

generate a provision API that calls to return the provision identity; and trigger the dynamic workflow based on the provision identity.

12. The system according to claim 11, wherein the provision API is utilized for one or more of the following: submitting a request, viewing request status, viewing all requests, updating a request, cancelling a request, and cloning a request.

13. A non-transitory computer readable medium configured to store instructions for implementing a single window integrated platform, the instructions, when executed, causes a processor to perform the following:

receive a request from a user via a user computing device to develop a micro service;

authenticate the user based on verifying login information of the user;

receive information data related to the requested micro service;

generate products application programming interface (API) to display selectable products based on the information data of the requested micro service;

receive input on selected products;

trigger a dynamic workflow based on the selected products;

interact with onboarding APIs to develop the micro service in response to the triggering of the dynamic workflow; and transmit a notification to the user computing device when an end state of the dynamic workflow is detected, wherein the products API is utilized for one or more of the following: adding products, updating products, deleting products, getting products, getting trending products, and sorting requested products.

14. The non-transitory computer readable medium according to claim 13, wherein the instructions, when executed, causes the processor to further perform the following:

track all dependencies associated with the requested micro service centrally on the single window integrated platform.

15. The non-transitory computer readable medium according to claim 13, wherein the single window integrated platform is configured to receive user input to replicate same actions in a single click for multiple environments.

16. The non-transitory computer readable medium according to claim 13, wherein the instructions, when executed, causes the processor to further perform the following:

retrieve application meta data associated with the requested micro service by utilizing an infrastructure and application reference data API.

17. The non-transitory computer readable medium according to claim 13, wherein the instructions, when executed, causes the processor to further perform the following:

receive a request for a provision identity associated with the micro service;

generate a provision API that calls to return the provision identity; and trigger the dynamic workflow based on the provision identity.

18. The non-transitory computer readable medium according to claim 17, wherein the provision API is utilized for one or more of the following: submitting a request, viewing request status, viewing all requests, updating a request, cancelling a request, and cloning a request.

* * * * *